United States Patent [19]

Jackson

[11] E Re. 31,203

[45] Reissued Apr. 12, 1983

[54] APPARATUS FOR CLEANING INSIDE AND OUTSIDE SURFACES OF CONTAINERS

[75] Inventor: John M. Jackson, Potters Bar, England

[73] Assignee: Cleamax Limited, Hertfordshire, England

[21] Appl. No.: 930,658

[22] Filed: Aug. 2, 1978

Related U.S. Patent Documents

Reissue of:

[64] Patent No.: 4,026,311
Issued: May 31, 1977
Appl. No.: 560,143
Filed: Mar. 20, 1975

[30] Foreign Application Priority Data

Mar. 21, 1974 [GB] United Kingdom ..... 12651/74

[51] Int. Cl.[3] ..... B08B 3/00; B67C 1/00

[52] U.S. Cl. ..... 134/48; 134/22.18; 134/50; 134/54; 134/170

[58] Field of Search ..... 134/22 R, 23, 25 R, 134/26, 30, 34, 48, 50, 54, 95, 152, 158, 166 R, 170, 10, 24, 25 A, 37, 79, 80, 81, 133, 154, 168 R, 171

[56] References Cited

U.S. PATENT DOCUMENTS

| | | | |
|---|---|---|---|
| 1,644,384 | 10/1927 | Kendall | 134/109 X |
| 1,661,602 | 3/1928 | Dary | 134/170 |
| 1,799,525 | 4/1931 | Morgan | 134/170 X |
| 2,211,892 | 8/1940 | Giese | 134/170 |
| 2,606,567 | 8/1952 | Cooper | 134/22 R X |
| 2,678,052 | 5/1954 | Moreland | 134/158 X |
| 3,043,318 | 7/1962 | Hi | 134/170 X |
| 3,088,473 | 5/1963 | Rogge | 134/170 X |
| 3,097,658 | 7/1963 | Runco | 134/81 |
| 3,357,396 | 12/1967 | Melind | 134/152 X |
| 3,413,988 | 12/1968 | Butler | 134/166 R X |
| 3,614,958 | 10/1971 | Perrier | 134/48 |
| 3,868,960 | 3/1975 | Cove et al. | 134/10 X |

FOREIGN PATENT DOCUMENTS

| | | |
|---|---|---|
| 1215461 | 4/1960 | France . |
| 316031 | 7/1929 | United Kingdom . |
| 360504 | 11/1931 | United Kingdom . |
| 399352 | 10/1933 | United Kingdom . |
| 1018286 | 1/1966 | United Kingdom . |
| 1119201 | 7/1968 | United Kingdom . |
| 1348812 | 3/1974 | United Kingdom . |

*Primary Examiner*—Richard V. Fisher
*Attorney, Agent, or Firm*—Browdy and Neimark

[57] ABSTRACT

Apparatus for cleaning open-mouthed cylindrical containers has a plurality of pot assemblies mounted on a turntable rotatable to move each pot assembly past an unloading station for discharge of containers from the pot assemblies and a loading station for insertion of containers into the pot assemblies. Each pot assembly comprises a body co-operating with a lid to define a cavity for reception of a container, the cavity having a shape corresponding approximately to that of the container and having a size such that the container subdivides the cavity into two chambers in which the walls of the cavity are spaced close to the inside and outside surfaces of the container. Cam rollers on each pot assembly co-operate with cam tracks, upon rotation of the turntable, to open the lid immediately prior to passage past the unloading station and to close the lid immediately after passage past the loading station. During passage between the loading and unloading stations cleaning liquid is circulated through the chambers, the liquid flowing along the inside and outside surface of the container to clean the surfaces. The liquid flows at high speed due to the small volume of the chambers. Rinsing water is then circulated through the chambers, and finally drying fluid to dry the container before discharge at the unloading station.

28 Claims, 10 Drawing Figures

Figure 1:
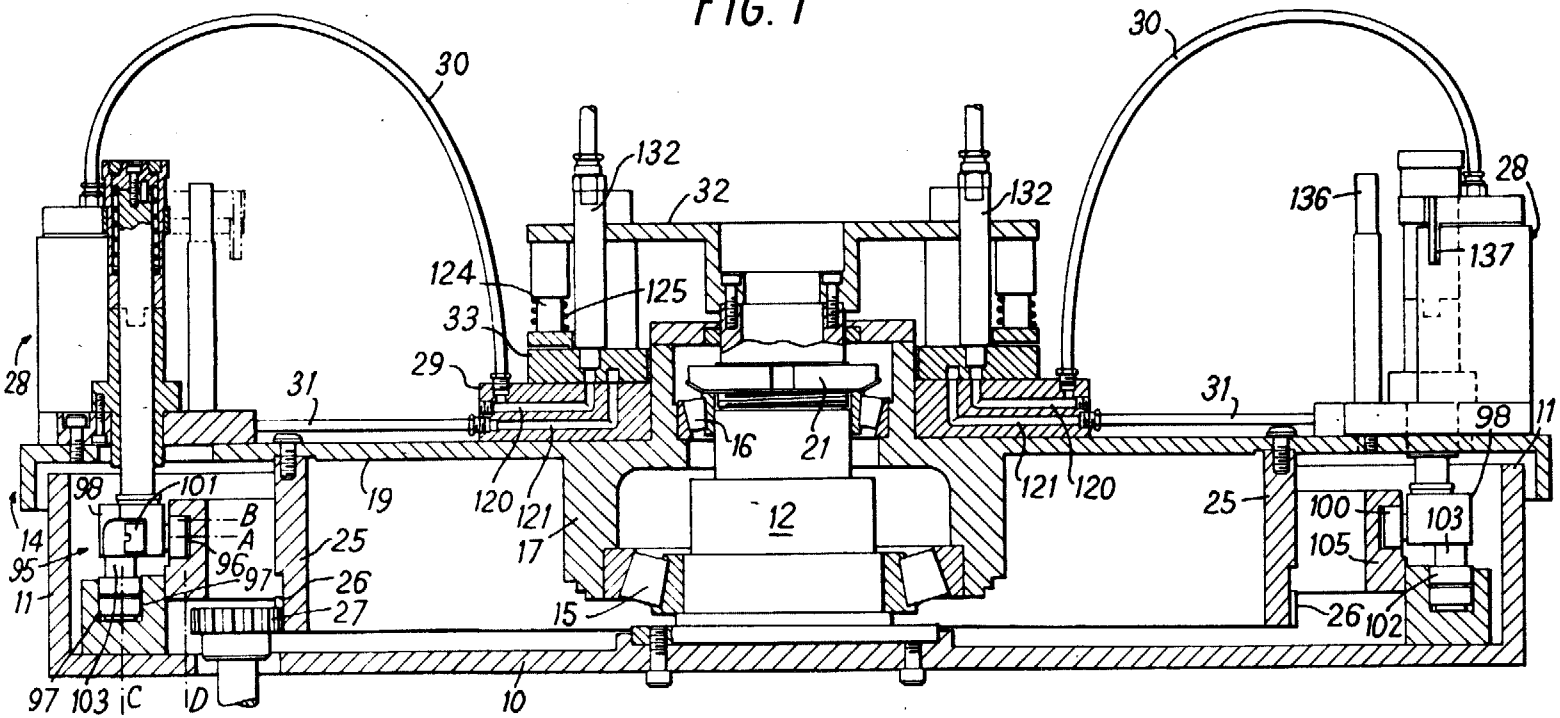

30
77
71
60
58
65
76
72
61
67
73
75
66
56
63
64
68
74
70
48
57
49
46
47
42
38
54
41
40
55
39
51
36
43
52
50
45
85
87
89
88
84
86
90
80
83
81
91
92
82

APPARATUS FOR CLEANING INSIDE AND OUTSIDE SURFACES OF CONTAINERS

Matter enclosed in heavy brackets [ ] appears in the original patent but forms no part of this reissue specification; matter printed in italics indicates the additions made by reissue.

This invention relates to the cleaning of containers or jars, and is concerned more particularly but not exclusively to the cleaning of open-mouthed metal containers of the kind comprising a cylindrical body open at one end and closed at the other end by a circular disc which may either be flat or contoured to provide resistance to internal pressure.

Metal containers of this kind are commonly used for the packing of aerated beverages and they are often made by drawing in a single piece. The action of drawing involves the use of lubricants which have to be completely removed before such containers can be used for food packaging or be satisfactorily printed on the outside for display purposes.

It is normal practice for such containers to be cleaned by placing them on a conveyor and subjecting them to high pressure sprays of detergent water followed by sprays of washing water, followed by a period of draining and drying by means of hot air circulation.

When such containers are made from aluminium it is sometimes desirable to [includes] *include* a dilute acid treatment to etch the surface for improved ink adhesion when the containers are decorated.

As the whole process of washing and drying is carried out by randomly disposed liquid and air jets, the duration of the cycle has to be prolonged to ensure complete washing and drying of all parts of all containers. Such conveyor systems when designed for high volume production are massive and very costly involving the use of considerable heat and mechanical energy.

An alternative method is to pass the conveyor system through a degreasing tank containing trichlorethylene vapour prior to drying by hot air circulation.

Such equipment though less costly and more compact has a disadvantage that stoppages due to malfunction of the mechanism are difficult to deal with on account of toxicity of the degreasing fluids and vapours freely circulating within the cleaning apparatus.

The object of the invention is to provide an improved method and apparatus for cleaning a container which is not subject to the above disadvantages.

According to the invention there is provided a method of cleaning an open-mouthed container, comprising mounting the container in a cavity in a body, the cavity having a shape corresponding approximately to that of the container with the walls of the cavity spaced close to the surfaces of the container, and the container subdividing the cavity into two chambers, and passing a cleaning fluid through the chambers so that the cleaning fluids fills the chambers and flows along the surfaces of the container.

The method of the invention enables containers to be cleaned thoroughly in a precisely controlled manner at high speed with the minimum consumption of cleaning fluid.

Turbulence is preferably induced in the fluid flowing through the chambers in order to improve the cleaning action of the fluid on the container, for example by passing the fluid across roughened or grooved surfaces in the cavity.

The container can conveniently be dried immediately after cleaning by passing a drying fluid, for example hot air, through the chambers.

According to the invention there is also provided apparatus for cleaning an open-mouthed container of a given size, comprising a pot assembly having a body and a lid defining a cavity for reception of the container, the lid being movable into an open position to permit introduction of the container into the cavity, means for centering the container in the cavity, the cavity having a shape corresponding approximately to that of the container and a size such that the container subdivides the cavity into two chambers in which the walls of the cavity are spaced close to the inside and outside surfaces of the container, and conduit means for passing cleaning fluid through said chambers so that the cleaning fluid fills the chambers and flows along the inside and outside surfaces of the container.

The apparatus of the invention can readily be adapted to operate automatically or semi-automatically, by providing a plurality of pot assemblies as defined above supported on a turret rotatably mounted on a frame, drive means operable to rotate the turret so that each pot assembly passes in succession past a container unloading station and a container loading station, and lid control means operable to move the lid of each pot assembly into the open position immediately prior to passage of the pot assembly past the unloading station and to move the lid into the closed position immmediately after passage of the pot assembly past the loading station, and valve means for regulating flow of fluids through said conduit means and chambers only during passage of each pot assembly between the loading station and the unloading station.

Figure 2:
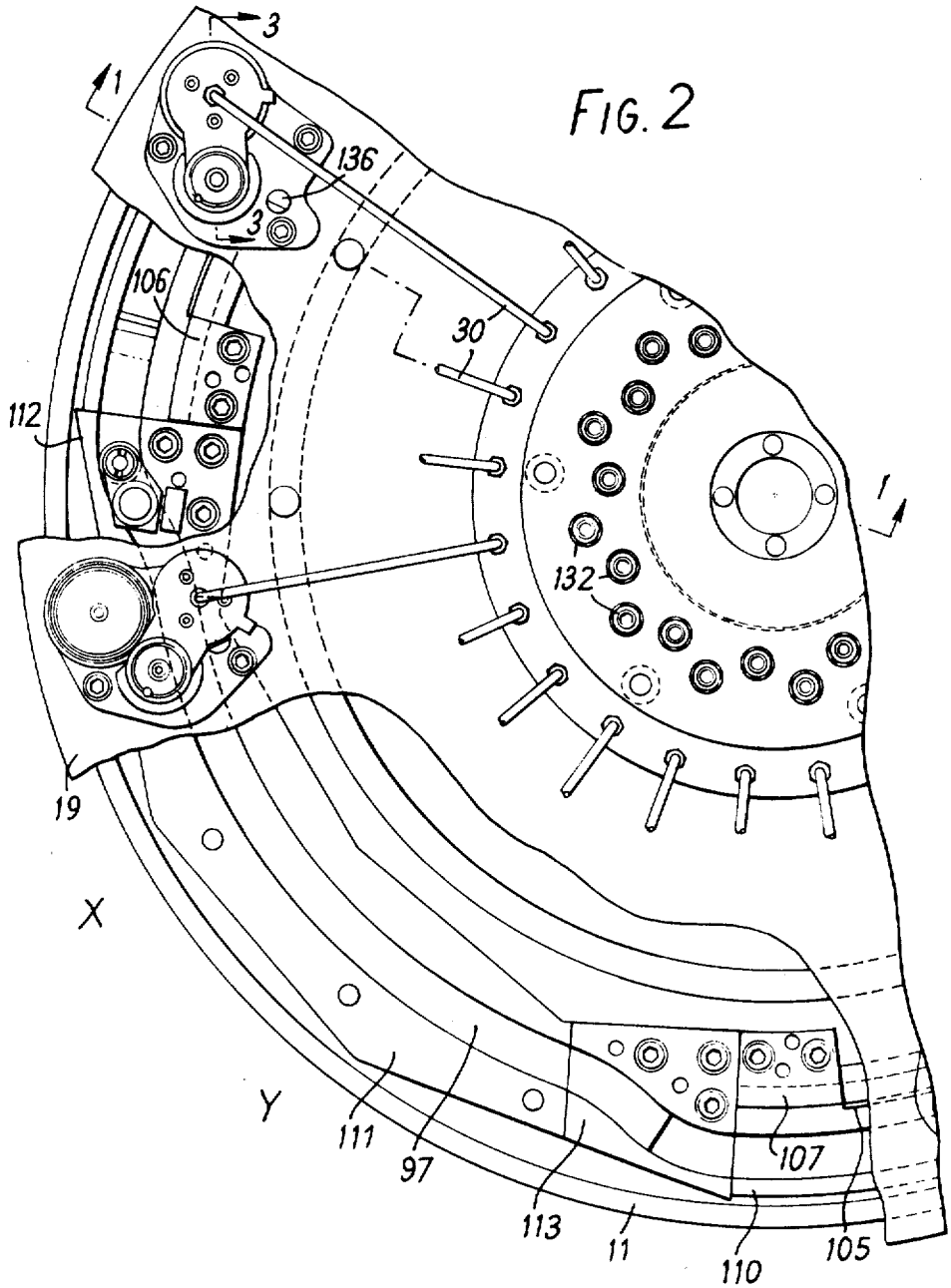
Figure 3:
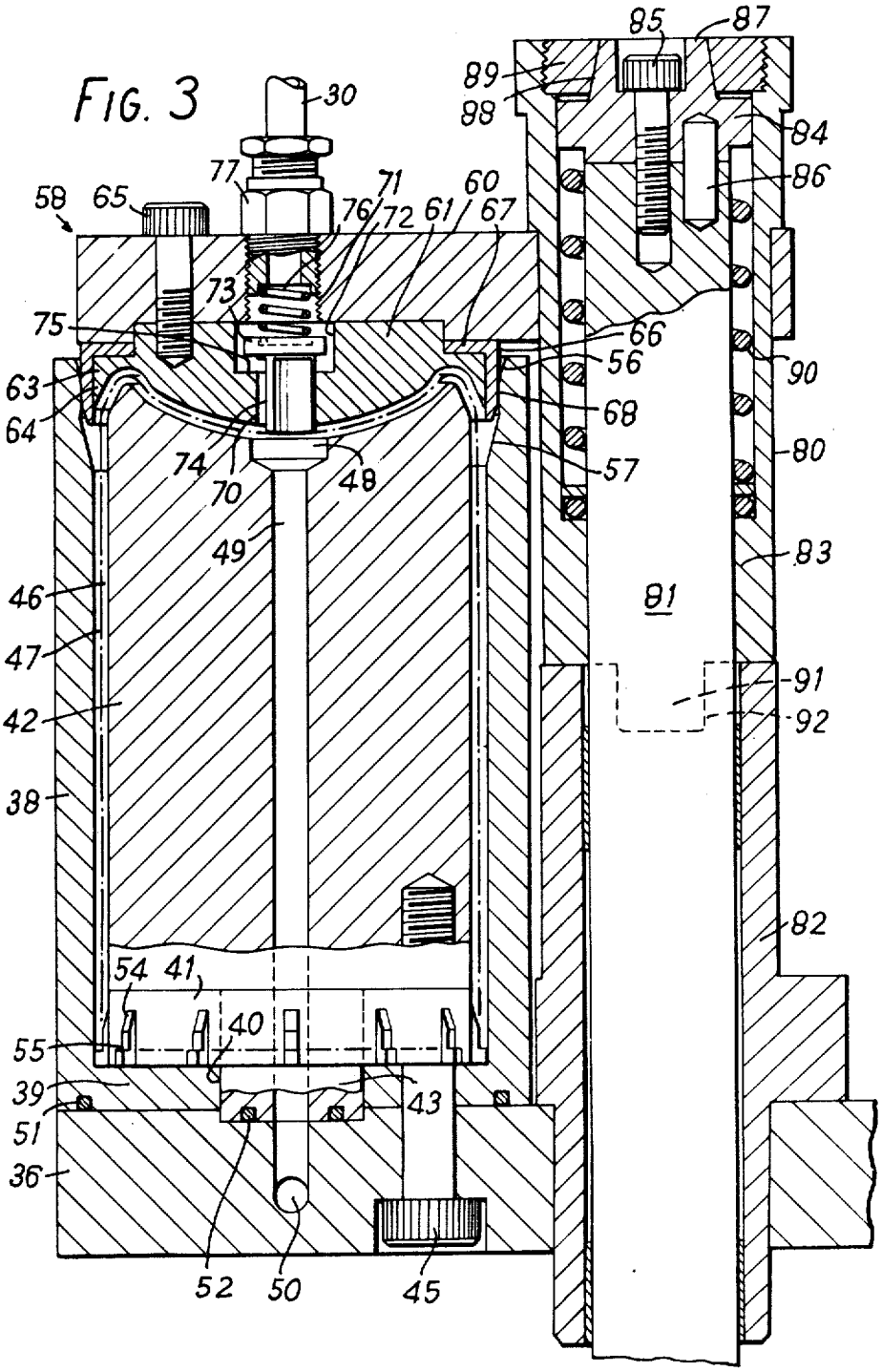
Figure 10:
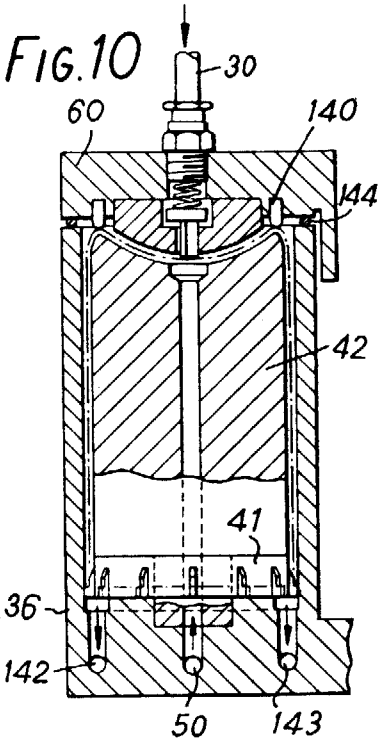
Figure 9:
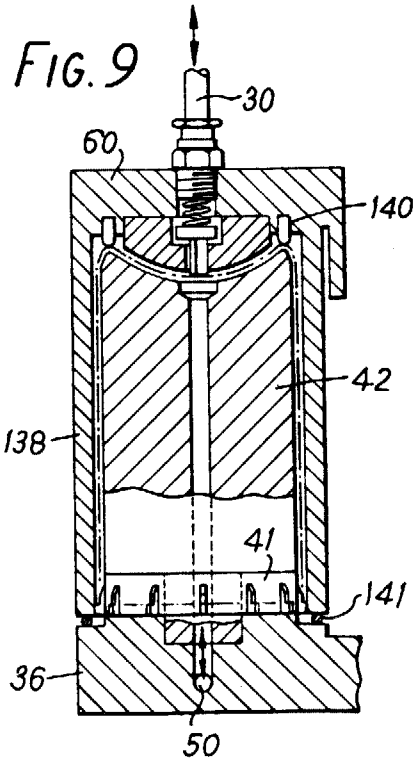
Figure 8:
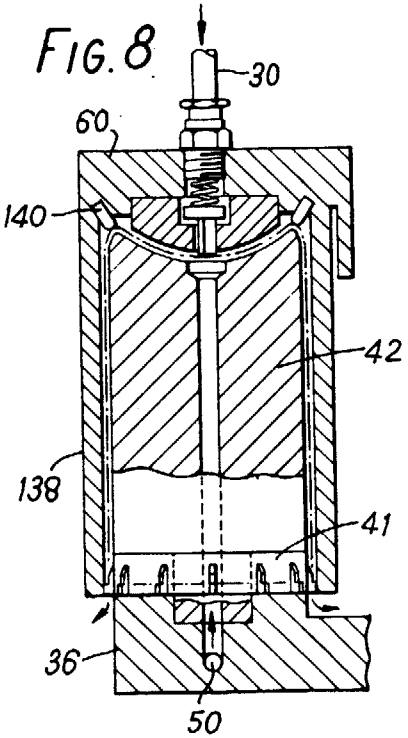
Figure 4:
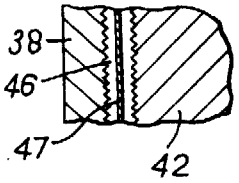
Figure 5:
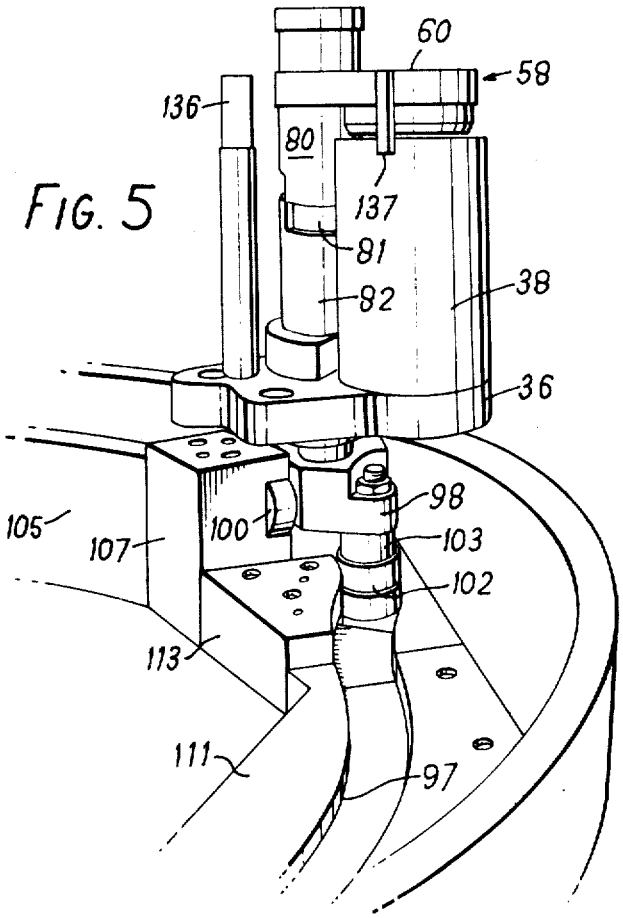
Figure 6:
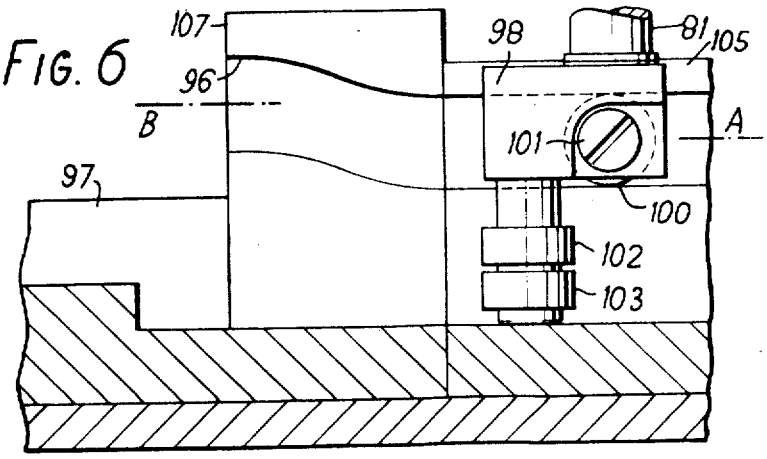
Figure 7:
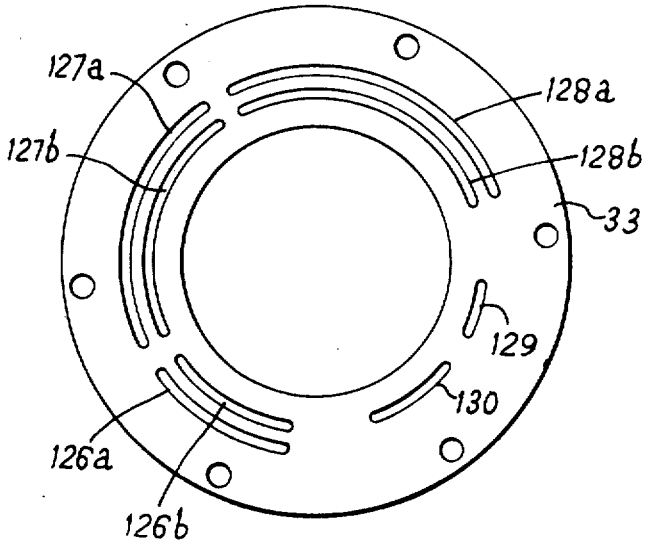

Apparatus suitable for cleaning open-mouthed containers of a given size and contour in accordance with the invention will now be described, by way of example, with reference to the accompanying drawings, in which:

FIG. 1 is a sectional elevation view of the apparatus,

FIG. 2 is a plan view of part of the apparatus, partially cut away to show details of the construction, FIG. 3 is a sectional elevation view of an enlarged scale of part of one of the pot assemblies of the apparatus, FIG. 4 is a detail view, on an even larger scale, of part of the walls defining the container receiving cavity in a pot assembly, FIG. 5 is a perspective view of a pot assembly and the cam tracks for operating the lid of the port assembly, the top plate of the turret being removed, FIG. 6 is an elevation view of the cam tracks shown in FIG. 5, FIG. 7 is a view of the underside of the distribution ring for fluids to be fed to the pot assemblies, and FIGS. 8, 9, 10 show alternative constructions of pot assemblies.

The apparatus shown in FIGS. 1–7 comprises a circular base plate 10 having a peripheral wall 11, a vertical spindle 12 secured to the centre of the base plate, and a turret 14 rotatably mounted by bearings 15, 16 on the spindle. The turret comprises a hub 17 on which the bearings are mounted, and a circular top plate 19. The bearings 15, 16 are held in position by a nut 21 screwed on the spindle. A cylinder 25 co-axial with the spindle 12 is secured to the underside of the top plate 19, the lower end portion of the cylinder 25 being formed with teeth 26 which mesh with a pinion 27 rotatable by drive mechanism (not shown) for turning the turret. The top plate 19 is fitted with 24 pot assemblies 28 for reception of the containers to be cleaned, and a manifold ring 29 connected by flexible pipes 30, 31 to the pot assemblies for conveying cleaning, drying and operating fluids to and from the pot assemblies. A plate 32 on the top of the spindle 12 supports a distributor ring 33 for feeding fluid into and away from the manifold ring.

Each pot assembly 28 comprises a support plate 36 (FIG. 3) secured to the top plate 19, an upright cylindrical shell 38 mounted on the plate 36, the top of the shell being open and the bottom having an end wall 39 formed with a central aperture 40, a centering ring 41 mounted in the shell on the end wall 39, and a cylindrical core 42 mounted in the shell on the ring 41, the bottom of the core having a spigot 43 which extends as a close fit through the ring 41 and the aperture 40, and the bottom of the spigot being seated in a recess in the support plate 36. Screws 45 on the plate 36 extend upwards through apertures in the end wall 39 and ring 41 and are screwed into the core, thereby securely clamping the components together. The core 42 cooperates with the shell 38 to form a cavity 46 for the reception of a container 47 to be cleaned. A recess is formed in the top of the core 42 at the centre thereof, and an outlet duct 49 extends from the recess downwards through the core and spigot 43 and connects with a further duct 50 in the support plate 36. Sealing rings 51, 52 are mounted in grooves in the bottom surfaces of the shell 38 and spigot 43 respectively. The centering ring 41 has an outer wall which is aligned with the outer wall of the core, and the ring 41 is provided with axially extending fins 54 spaced around the ring, the upper ends of the fins being chamfered and adapted to engage inside the mouth of a container fed open-end downwards onto the core so as to centre the container on the core and each fin is formed with a ledge 55 for support of a container. The inside surface of the upper end part of the shell is convex as shown at 56, and the inside surface of the shell immediately below the convex surface 56 is tapered downwardly as shown at 57, the remainder of the inside surface of the shell being cylindrical. The cylindrical inner surface of the shell 38 and the opposing outside surface of the core 42 are formed with a screw thread as shown in FIG. 4.

Each pot assembly includes a lid 58 consisting of a cover plate 60, a crown 61 located in a recess in the underside of the plate 60 and having an annular peripheral flange 63 formed with a downwardly projecting lip 64, the crown being secured to the plate 60 by screws 65, and an annular sealing member 66 having a radial wall 67 clamped between the flange 63 and the cover plate 60, and a cylindrical wall 68 extending downwards below the lip 64. The crown 61 is formed with a central aperture 70 aligned with an aperture 71 in the plate 60, the upper portion of the aperture 70 being enlarged to form a valve chamber 72 housing a valve member 73 having a stem 74 slidably mounted in the lower portion of the aperture 70. The valve member is adapted to block flow of fluid through the apertures 70, 71 when in a closed position in which it is engaged against the bottom wall 75 of the valve chamber, and the valve member is biased towards the closed position by a spring 76 compressed between the valve member and a tubular pipe connector 77 screwed into the aperture 71 in the plate 60. The stem 74 is of triangular cross section with recessed walls to permit fluid to flow past the stem in the aperture 70 when the valve member is in an open position spaced from the wall 75 of the valve chamber. The stem 74 has a length such that, when the valve member is in the closed position, the stem extends across the gap between the crown 61 and the core 42 and projects into the recess 48 in the top of the core.

The cover plate 60 is rigidly secured to a sleeve 80 mounted on a vertical shaft 81 which is in turn mounted in a bush 82 secured in an aperture in the support plate 36. The lower end portion of the sleeve 80 has an inwardly projecting step 83 which is a close sliding and rotational fit on the shaft, and the upper end of the shaft is fitted with a head 84 which is a close sliding and rotational fit inside the upper end portion of the sleeve 80. The head 84 is secured to the shaft by a screw 85 and pin 86. The upper end of the head 84 is formed with a conical spigot 87 adapted to engage in a conical socket 88 in a ring 89 screwed into the upper end of the sleeve 80. A coil spring 90 is compressed between the step 83 and the head 84, the spring urging the sleeve downwards to engage the conical socket 88 on its spigot. The lower end of the sleeve 80 is formed with two rectangular teeth 91 which engage in corresponding recesses 92 in the upper end of the bush 82 when the lid 58 is in the closed position, as shown in FIG. 3. The teeth 91 and recesses 92 form alignment means which prevent the lid being moved into its closed position except when the lid is at a predetermined angular setting relative to the shaft. It will be appreciated that upward movement of the shaft will lift the sleeve and cover plate 60 and thereby lift the lid of the pot assembly above the shell 38. Rotational movement of the shaft will then swing the lid laterally away from the shell 38, the torque being transmitted between the shaft 81 and the sleeve 80 by the frictional resistance between the conical spigot and socket 87, 88.

The lower end of the bush 82 projects through an aperture in the top plate 19 of the turret, and the shaft 81 extends downwards below the turret and is fitted with a cam roller assembly 95 which co-operates with a horizontal cam track 96 and a vertical cam track 97 mounted on the base plate. The roller assembly comprises a block 98 secured on the bottom of the shaft 81, a roller 100 rotatably mounted on a horizontal spindle 101 secured to the block 98, and a roller 102 rotatably mounted on a vertical spindle 103 projecting downwards from the block 96, the axis of the roller 102 being offset from the axis of the shaft 81. The spindle 103 extends a short distance below the roller 102 for a purpose explained hereinafter. The roller 100 is adapted to engage in the horizontal cam track 96 and the roller 102 is engaged in the vertical cam track 97.

The horizontal cam track 96 is formed by a channel shaped slot in the outside wall of an arcuate rail 105 which extends around approximately 270 degrees of the base plate, and two further slots in the outside walls of two cam blocks 106, 107 arranged one at each end of the arcuate rail, the roller 100 being a running fit in the slots. The centre line of the cam track in the rail 105 remains at a constant level indicated at A in FIG. 1. The cam track in the block 106 is arranged to lift the roller 100 up to the level B shown in FIG. 1. As shown in FIG. 6, the cam track in the block 107 is arranged to receive the roller 100 at the level B and lower the roller down to the level A.

The vertical cam track 97 comprises a channel spaced slot formed in the top surfaces of two arcuate rails 110, 111 and in the top surfaces of two cam blocks 112, 113 interposed between the ends of the rails 110, 111, the cam track extending continuously around the base plate. The rail 110 extends around an arc equal to that subtended by the rail 105 and cam blocks 106, 107 and the centre line of the cam track in rail 110 is at a constant radiius C (FIG. 1) from the axis of the turret. The base of the cam track on the part of the rail 110 surrounding rail 105 is at a level such that it is below the bottom end of the spindle 103 of the roller assembly 95, the height of the spindle 103 being of course determined by the roller 100 in the cam track 96 in rail 105, but the base of the cam track on the part of the rail 110 opposite cam block 106 rises to a level such that it is immediately below the bottom of the spindle 103. The centre line of the cam track in rail 111 is at a constant radius D (FIG. 1) from the axis of the turret and the base of the track is at a level such that, when the spindle 103 of the roller assembly rests on the base, the axis of the roller 100 is at the level B shown in FIG. 1. The cam tracks in the blocks 112, 113 form continuations of the cam tracks in the rails 110, 111 and, as shown in FIG. 2, are arranged so that a roller 102 rolling around the cam track in an anticlockwise direction is moved inwardly from radius C to radius D (FIG. 1) during passage along block 112 and moved outwardly from radius D to radius C during passage along block 113.

The manifold ring 29 is provided with a separate pair of ducts 120, 121 for each pot assembly 28, each duct 120 being connected by a flexible pipe 30 to the connection 77 on the associated pot assembly and each duct 121 being connected by a pipe 31 to the duct 50 in the associated pot assembly. The ducts 120, 121 open through the top surface of the ring 29, the ends of the ducts 120, 121 lying respectively in two common circles concentric with the turret axis. The distributor ring 33 is slidably mounted on vertical pillars 124 secured to the plate 32 and is urged downwards by coil springs 125 on the pillars into sliding contact with the top surface of the manifold ring. As shown in FIG. 7 the underside of the distributor ring is formed with a first pair of arcuate grooves 126a, 126b for circulating cleaning fluid through the pot assemblies, a second pair of arcuate grooves 127a, 127b for circulating rinsing water through the pot assemblies, a third pair of arcuate grooves 128a, 128b for circulating hot air through the pot assemblies, and two arcuate grooves 128a, 128b for circulating hot air through the pot assemblies, and two arcuate grooves 129, 130 for applying compressed air and vacuum respectively to the pot assemblies. The grooves 126a, 127a, 128a are all arranged on a common circle and adapted to register in succession with each of the ducts 120 upon rotation of the manifold ring with the turret, and the grooves 126b, 127b, 128b, 129, 130 are all arranged on a common circle and adapted to register on succession with each of the ducts 121 upon rotation of the manifold ring with the turret. All the arcuate grooves are connected through openings in the top of the distributor ring to pipes 132 for supplying and exhausting the fluids from the grooves.

In operation, the turret is rotated continuously by the pinion 27 in an anti-clockwise direction as shown in FIG. 2. When each pot assembly reaches the cam block 106, its roller 100 rides up the cam track 96 and thereby lifts the shaft 81, sleeve 80 and cover plate 60 so as to lift the lid 58 of the pot assembly. The roller 100 rides out of the track 96 at the end of the cam block 106 but the lid is held in the raised position by engagement of the spindle 103 on the base of the cam track 97 during movement of the pot assembly the cam blocks 106, 107. When the pot assembly reaches the block 107 the roller 100 enters the cam track 96 as shown in FIG. 5, the track 96 in block 107 forcing the shaft 81 downwards to close the lid. In the event of downward movement of the lid being obstructed, for example by a misplaced container in the pot assembly, the shaft 81 will merely slide within the sleeve 80 and compress the spring 90.

When each pot assembly reaches the cam block 112, the cam track 97 causes the roller 102 to move radially inwards and thereby causes the block 98 and shaft 81 to pivot in a clockwise direction as shown in FIG. 2, thereby moving the lid radially inwards to uncover the cavity in the pot assembly. The lid remains in the open position until the post assembly reaches the cam block 113, whereupon the cam track 97 therein causes the roller to move radially outwards and cause the block 98 and shaft 82 to swing the lid outwards over the pot assembly. It will be appreciated that, since the pot assembly reaches the cam block 106 before the cam block 112, the roller 100 will raise the lid to withdraw the crown 61 and seal 66 from the top of the shell 38 before the roller 102 causes the lid to swing inwards. Similarly, since the pot assembly reaches the cam block 113 before the cam block 107, the roller 102 will cause the lid to swing outwards to a position above the shell 38 before the roller 100 lowers the lid.

In the event of radial inwards or outwards movement of the lid being obstructed, the turning force exerted by the roller 102 on the shaft 81 will overcome the frictional force between the conical spigot and socket 87, 88 so that the shaft will turn relative to the sleeve 80. The lid will then be displaced relative to the shaft 81, that is the lid will no longer be at the previously mentioned predetermined angular setting relative to the shaft, and if the shaft is then drawn down by the roller to close the lid, the teeth 91 on the sleeve 80 will abut against the top of the bush 82 and prevent the sleeve 80 being drawn down with the shaft. In order to centralise the lid relative to the shaft 81 after an obstruction has caused relative movement therebetween, the support plate 36 of each pot assembly is provided with an abutment post 136 to abut the lid at its radially innermost position and the cover plate 60 of the lid is provided with a downwardly projecting lug 137 arranged to abut the shell 38 at the radially outermost position of the lid.

Mechanism (not shown) for receiving containers discharged from the pot assemblies is provided at an unloading station X alongside the rail 111 and mechanism (not shown) for introducing containers into the pot assemblies is provided at a loading station Y alongside the rail 111. These mechanisms can be of any suitable construction known in the art. The lid of each pot assembly is of course in the fully open position during passage of the pot assembly along the rail 111. The distribution ring 33 is arranged so that the ducts 121 in the manifold ring register with the compressed air groove 129 during passage of the associated pot assembly past the unloading station X and register with the vacuum groove 130 during passage of the associated pot assembly past the loading station Y.

One operating cycle for a pot assembly in which it travels from the loading station Y around the apparatus to the unloading station X upon rotation of the turret through one revolution will now be described.

When the pot assembly is in register with the loading station, the lid is fully open and the ducts 49, 50 are connected through pipe 31 and duct 121 to the vacuum groove 130. The loading mechanism feeds a container open-end downwards into the cavity 47, and the vacuum in duct 49 causes air to be drawn into the duct and thereby draws the container downwards onto the ledges 55 on the fins 54. The lid then closes as the pot assembly travels past the cam blocks 113, 107. As shown in FIG. 3 the core 42 and shell 38 have a shape corresponding to that of the container and are of a size such that the container is spaced from the core and shell and subdivides the cavity therebetween into an inner chamber between the core and container and an outer chamber between the shell and container. The two chambers are of the minimum practical width, for example 0.015 inches, and should preferably not exceed 0.15 inches. The inner chamber is in direct communication through ducts 49, 50 and pipe 31 with the duct 121 in the manifold ring. The base of the container bears against the valve stem 74 and holds the valve 73 open, as shown in FIG. 3, so that the outer chamber is in direct communication through apertures 70, 71 and pipe 30 with the duct 120 in the manifold ring.

When the ducts 120, 121 associated with the pot assembly register with the arcuate grooves 126a, 126b, cleaning liquid from groove 126a enters the top of the outer chamber, flows down the sides of the outer chamber, through the slots between the fins 54, up the sides of the inner chamber, across the top of the inner chamber, and back to the groove 126b through the duct 49. The liquid completely fills the two chambers and, due to the very narrow [wifth] *width* of the chambers, travels at a fast speed across all the surfaces of the container. The screw thread on the walls of the core and shell cause turbulence in the liquid and thereby ensure the maximum cleaning effect on the surfaces of the container. Instead of providing screw threads on the core and shell, these parts may be shot blasted or otherwise roughened so as to cause turbulence in the liquid. Alternatively, air may be introduced into the liquid, conveniently in the feed pipe to the pump for the liquid, to form bubbles which will cause turbulence in the liquid in the chambers.

Rinsing water will flow through the two chambers when the ducts 120, 121 register with the grooves 127a, 127b in the distributor ring, and hot air will flow through the two chambers to dry the container when the ducts 120, 121 register with the grooves 128a, 128b. The lid then opens as the pot assembly travels past the cam blocks 106, 112. When the pot assembly arrives at the unloading station the duct 121 registers with the groove 129 in the distributor ring and compressed air from the groove 129 enters the inner chamber and ejects the container from the pot assembly and into the unloading mechanism.

If any of the pot assemblies is not loaded with a container at the loading station, the valve 73 will remain engaged against the wall 75 and prevent entry into the cavity of the cleaning or rinsing fluids.

When the lid is closed on each pot assembly its lip 64 clamps the cylindrical wall 68 of the resilient sealing member against the convex surface 56 on the shell to provide a fluid tight fit. Moreover, since the wall 68 projects below the lip, fluid pressure in the outer chamber forces the wall 68 against the convex surface to provide an additional safeguard against leakage of liquid.

The apparatus described above is particularly suitable for use in cleaning containers with trichlorethylene or other highly toxic liquids or vapours, since the cleaning fluid flows in closed circuits.

FIGS. 8, 9, 10 show alternative constructions of pot [assmblies] *assemblies* which could replace the pot assemblies 38 in apparatus adapted to accommodate them, and like parts are indicated by like reference numerals.

The pot assembly of FIG. 8 has an outer shell [158] *138* formed integral with the cover plate 60 of the lid, the bottom of the shell being open so that the inner and outer chambers formed between a container and the shell and core are open at the bottom. The container rests on the ledges 55 on the centering ring, as in the pot assembly 38, but the lid is provided with pins 140 which project into the cavity and which are adapted to engage a container therein to space lid from the top of the container. In operation, cleaning liquid is supplied to the outer and inner chambers through the pipe 30 and duct 50 and escapes through the openings at the bottom of the chambers.

The pot assembly of FIG. 9 is similar to that of FIG. 8, except that a seal 141 is provided between the bottom of the shell and the support plate 36. Cleaning liquid supplied through either the pipe 30 or duct 50 flows in succession through the two chambers, as in the pot assembly 38, and exhaust through the duct 50 or pipe 30 respectively.

The pot assembly of FIG. 10 has a shell and core similar to that of the pot assembly 38, but is provided with exhaust ducts 142, 143 at the bottom of the cavity so that cleaning liquid can be fed simultaneously through the pipe 30 and duct 50 into the two chambers formed between a container and the core and shell. The lid is spaced from a container in the cavity by pins 140 and an O ring seal 144 is provided between the cover plate 60 of the lid and the top of the shell.

I claim:

1. Apparatus for cleaning an open-mouthed container of a given size, comprising at least one pot assembly having a core, a shell and a lid defining a cavity for reception of the container, the cavity having walls and the lid being movable into an open position to permit introduction of the container into the cavity; container centering means in form of a plurality of fins on at least one of said walls of said cavity, said fins having chamfered ends adapted to engage the mouth of the container in the cavity and the cavity having a shape corresponding approximately to that of the container and a size such that the container subdivides the cavity into two chambers in which the walls of the cavity are spaced close to the inside and outside surfaces of the container; and conduit means for passing cleaning fluid through said chambers so that the cleaning fluid fills the chambers and flows along the inside and outside surface of the container.

2. Apparatus as claimed in claim 1, wherein at least part of one wall of the cavity has a rough surface adapted to cause turbulence in fluid flowing through the chambers.

3. Apparatus as claimed in claim 2, wherein at least part of one wall of the cavity has grooves providing said rough surface.

4. Apparatus as claimed in claim 1, wherein the cleaning fluid is a cleaning liquid, and including means operable to introduce air into the cleaning liquid in said conduit means so as to form bubbles in the liquid.

5. Apparatus as claimed in claim 1, wherein the fins are provided with ledges adapted to engage the mouth of the container in the cavity and support the container therein.

6. Apparatus for cleaning open-mouthed containers of a given size, the apparatus comprising a frame; a turret rotatably mounted on said frame; a plurality of pot assemblies supported on the turret, each pot assembly having a core, a shell, and a lid co-operating with said core and shell to define a cavity for reception of one of said containers and said cavity having at least one wall; means for centering the container in the cavity, the cavity having a shape corresponding approximately to that of the container and a size such that the container therein subdivides the cavity into two chambers in which the wall of the cavity is spaced close to the inside and outside surface of the container, and conduit means for passing cleaning fluid through said chambers so that the cleaning fluid fills the chambers and flows along the inside and outside surfaces of the container, drive means operable to rotate the turret so that each pot assembly passes in succession past a container unloading station and a container loading station, lid control means operable to move the lid of each pot assembly into an open position immediately prior to passage of the pot assembly past said unloading station to permit ejection of a cleaned container at said unloading station and introduction of a container to be cleaned into the cavity of the pot assembly at said loading station, said lid control means also being operable to move the lid of each pot assembly into a closed position immediately after passage of the pot assembly past said loading station, and valve means for regulating flow of fluid through said conduit means and chambers only during passage of each pot assembly between said loading station and said unloading station.

7. Apparatus as claimed in claim 6, including means for extracting air from the cavity in each pot assembly in register with the container loading station, so that a container inserted into the cavity will be drawn to the bottom of the cavity by suction.

8. Apparatus as claimed in claim 6 including means for supplying compressed air to the cavity in each pot assembly in register with the container unloading station to eject a container therefrom.

9. Apparatus as claimed in claim 6, wherein the lid of each pot assembly is connected to a shaft movable axially and rotationally by cam means to displace the lid between its closed and open positions.

10. Apparatus as claimed in claim 9, wherein the lid is connected to a sleeve mounted on said shaft, said sleeve and shaft having co-operating abutments thereon, and a spring biases the sleeve in a direction to engage said abutments with one another, said sleeve being movable in the opposite direction against the action of the spring to move the lid in a direction away from the core of the pot assembly.

11. Apparatus as claimed in claim 10, wherein said abutments have surfaces thereon in frictional sliding contact for transmitting torque between the shaft and sleeve.

12. Apparatus as claimed in claim 10 and including alignment means adapted to prevent the lid *being* moved into the closed position except when the lid is at a predetermined angular setting relative to said shaft.

13. Apparatus as claimed in claim 12, including abutments adapted to engage the lid at opposite ends of its arcuate movement under the action of said cam means when the lid is in said predetermined angular setting relative to the shaft.

14. Apparatus as claimed in claim 12, wherein said shaft is mounted in a bush, said sleeve is formed with teeth and said bush is formed with recesses engageable with said teeth when the lid is in the closed position, said teeth and recesses constituting said alignment means.

15. Apparatus as claimed in claim 9, wherein said shaft is parallel to the axis of the core of the pot assembly, said cam means comprise first and second followers connected to said shaft for movement therewith, and said frame is provided with first and second tracks for co-operation with said first and second cam followers respectively, the first cam follower being movable under the influence of the first cam track during rotation of the turret to effect axial movement of the shaft and thereby displace the lid axially relative to the core of the pot assembly, and the second cam follower being movable under the influence of the second cam track during rotation of the turret to effect angular movement of the shaft and thereby swing the lid in direction transverse to the axis of the core of the pot assembly.

16. Apparatus as claimed in claim 15, wherein said first track extends only part-way around the frame and is arranged to engage the first cam follower only during the period in the rotation of the turret in which the lid is substantially aligned axially with the core of the pot assembly.

17. Apparatus as claimed in claim 6, wherein each pot assembly is provided with valve means preventing entry of fluid into the cavity when empty of a container, and actuating means operable to open the valve means in response to insertion of a container in the cavity and closure of the lid on the cavity.

18. Apparatus as claimed in claim 17, wherein the valve means comprises a closure member mounted in an inlet duct in the lid, the closure member being biased by a spring against a valve seat, and the actuating means comprises a stem on the closure member extending across the cavity when the valve is in the closed position.

19. Apparatus as claimed in claim 6, wherein the spacing between the core and shell is not greater than 0.15 inches, preferably 0.015 inches.

20. Apparatus as claimed in claim 6, wherein the lid is formed integral with the shell.

21. Apparatus as claimed in claim 6, wherein the core of each pot assembly is provided with duct means for introducing the cleaning fluid into the inner chamber formed between the core and the inside surface of the container in the pot assembly, and said centering means comprises abutments on the lid adapted to engage the base of the container forced towards the lid by the pressure of fluid in said inner chamber.

22. Apparatus as claimed in claim 21, wherein said abutments consist of pins mounted in the lid and projecting into the cavity in the pot assembly.

23. Apparatus as claimed in claim 21, wherein said centering means also comprise a plurality of fins on the wall of the cavity, the fins having chamfered ends adapted to engage the mouth of a container in the cavity.

24. An apparatus as claimed in claim 6, wherein the means for centering the container comprises a plurality of fins on the wall of the cavity, the fins having chamfered ends adapted to engage the mouth of the container in the cavity.

25. Apparatus as claimed in claim 6, wherein at least part of one wall of the cavity has a rough surface adapted to cause turbulence in fluid flowing through the chambers.

26. Apparatus as claimed in claim 25, wherein at least part of one wall of the cavity has grooves providing said rough surface.

27. Apparatus as claimed in claim 6, wherein the cleaning fluid is a cleaning liquid, and including means operable to introduce air into the cleaning liquid in said conduit means so as to form bubbles in the liquid.

*28. Apparatus for cleaning open-mouthed containers of a given size, the apparatus comprising a frame; a turret rotatably mounted on said frame; a plurality of pot assemblies supported on the turret, each pot assembly having a core, a shell, and a lid co-operating with said core and shell to define a cavity for reception of one of said containers and said cavity having at least one wall, the cavity having a shape corresponding approximately to that of the container and a size such that the container therein subdivides the cavity into two chambers in which the wall of the cavity is spaced close to the inside and outside surface of the container, and conduit means for passing cleaning fluid through said chambers so that the cleaning fluid fills the chambers and flows along the inside and outside surfaces of the container, drive means operable to rotate the turret so that each pot assembly passes in succession past a container unloading station and a container loading station, lid control means operable to move the lid of each pot assembly into an open position immediately prior to passage of the pot assembly past said unloading station to permit ejection of a cleaned container at said unloading station and introduction of a container to be cleaned into the cavity of the pot assembly at said loading station, said lid control means also being operable to move the lid of each pot assembly into a closed position immediately after passage of the pot assembly past said loading station, and valve means for regulating flow of fluid through said conduit means and chambers only during passage of each pot assembly between said loading station and said unloading station.*

* * * * *